(12) United States Patent
Leake

(10) Patent No.: US 8,874,483 B2
(45) Date of Patent: Oct. 28, 2014

(54) GATED UNLOCK CODES FOR VIDEOGAME FEATURES AND CONTENT

(75) Inventor: Brian Leake, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 873 days.

(21) Appl. No.: 12/807,579

(22) Filed: Sep. 8, 2010

(65) Prior Publication Data

US 2012/0058819 A1    Mar. 8, 2012

(51) Int. Cl.
  G06Q 99/00    (2006.01)
  A63F 13/40    (2014.01)
  G06F 21/12    (2013.01)
  H04L 29/06    (2006.01)

(52) U.S. Cl.
  CPC ............ *A63F 13/10* (2013.01); *G06Q 2220/12* (2013.01); *A63F 2300/401* (2013.01); *A63F 2300/609* (2013.01); *G06F 21/121* (2013.01); *G06F 2221/2109* (2013.01); *H04L 67/38* (2013.01)
  USPC .............................................. 705/51; 463/29

(58) Field of Classification Search
  USPC ............................ 705/1.1, 51, 52; 463/25, 29; 340/5.1–5.92
  See application file for complete search history.

(56) References Cited

U.S. PATENT DOCUMENTS

| | | | | |
|---|---|---|---|---|
| 7,611,409 B2 * | 11/2009 | Muir et al. | ....................... | 463/29 |
| 7,666,082 B2 * | 2/2010 | Kane et al. | ....................... | 463/17 |
| 7,699,703 B2 * | 4/2010 | Muir et al. | ....................... | 463/29 |
| 7,702,536 B1 * | 4/2010 | Alabraba et al. | ........... | 705/14.16 |
| 7,766,739 B2 * | 8/2010 | Kane et al. | ....................... | 463/17 |
| 7,771,264 B2 * | 8/2010 | Kane et al. | ....................... | 463/16 |
| 7,815,502 B2 * | 10/2010 | Hardy et al. | .................... | 463/16 |
| 7,819,747 B2 * | 10/2010 | Kane et al. | ....................... | 463/29 |
| 7,976,374 B2 * | 7/2011 | Kane et al. | ....................... | 463/17 |
| 8,025,567 B2 * | 9/2011 | Kane et al. | ....................... | 463/29 |
| 8,029,361 B2 * | 10/2011 | Hardy et al. | .................... | 463/29 |
| 8,038,529 B2 * | 10/2011 | Kane et al. | ....................... | 463/29 |
| 8,047,907 B2 * | 11/2011 | Kane et al. | ....................... | 463/16 |
| 8,047,917 B2 * | 11/2011 | Kane et al. | ....................... | 463/42 |
| 8,224,750 B1 * | 7/2012 | Bennett et al. | .................. | 705/59 |
| 8,366,544 B2 * | 2/2013 | Walker et al. | ................... | 463/29 |
| 2005/0255911 A1 * | 11/2005 | Nguyen et al. | ................. | 463/25 |
| 2006/0025213 A1 * | 2/2006 | Kane et al. | ....................... | 463/29 |
| 2006/0172799 A1 * | 8/2006 | Kane et al. | ....................... | 463/25 |
| 2006/0189382 A1 * | 8/2006 | Muir et al. | ....................... | 463/29 |
| 2006/0229944 A1 * | 10/2006 | Walker et al. | ................... | 705/14 |
| 2007/0021198 A1 * | 1/2007 | Muir et al. | ....................... | 463/29 |
| 2007/0265068 A1 * | 11/2007 | Kane et al. | ....................... | 463/29 |
| 2008/0146322 A1 * | 6/2008 | Hardy et al. | .................... | 463/25 |
| 2008/0146323 A1 * | 6/2008 | Hardy et al. | .................... | 463/25 |
| 2008/0242406 A1 * | 10/2008 | Irving et al. | .................... | 463/29 |
| 2008/0274792 A1 * | 11/2008 | Walker et al. | ................... | 463/25 |

(Continued)

*Primary Examiner* — James D Nigh

(74) *Attorney, Agent, or Firm* — Farjami & Farjami LLP

(57) ABSTRACT

There is provided a system and method for gated unlock codes for videogame features and content. By maintaining a redemption database where master unlock codes are used to provide access to specific subsets of feature unlock codes, unique exclusive content may be provided for different retailers. In this manner, a universal game media containing all possible additional content may be utilized for retail distribution, reducing publishing costs while still providing customized versions for retailers with desirable exclusive content. By restricting each gaming device or user account to a single group or hierarchy of master unlock codes, the use of ancillary unlock codes with videogames purchased from different retailers may be discouraged, thereby preserving user incentives to purchase primary and secondary items with feature unlock codes at a single retailer.

18 Claims, 3 Drawing Sheets

(56) References Cited

U.S. PATENT DOCUMENTS

| | | | |
|---|---|---|---|
| 2009/0054148 A1* | 2/2009 | Hardy et al. | 463/42 |
| 2009/0176560 A1* | 7/2009 | Herrmann et al. | 463/25 |
| 2009/0176564 A1* | 7/2009 | Herrmann et al. | 463/29 |
| 2009/0191962 A1* | 7/2009 | Hardy et al. | 463/29 |
| 2009/0209333 A1* | 8/2009 | Kelly et al. | 463/29 |
| 2009/0227363 A1* | 9/2009 | Kelly et al. | 463/25 |
| 2010/0029376 A1* | 2/2010 | Hardy et al. | 463/25 |
| 2010/0160019 A1* | 6/2010 | Kane et al. | 463/16 |
| 2010/0197383 A1* | 8/2010 | Rader et al. | 463/25 |
| 2012/0021822 A1* | 1/2012 | DeWaal et al. | 463/29 |

\* cited by examiner

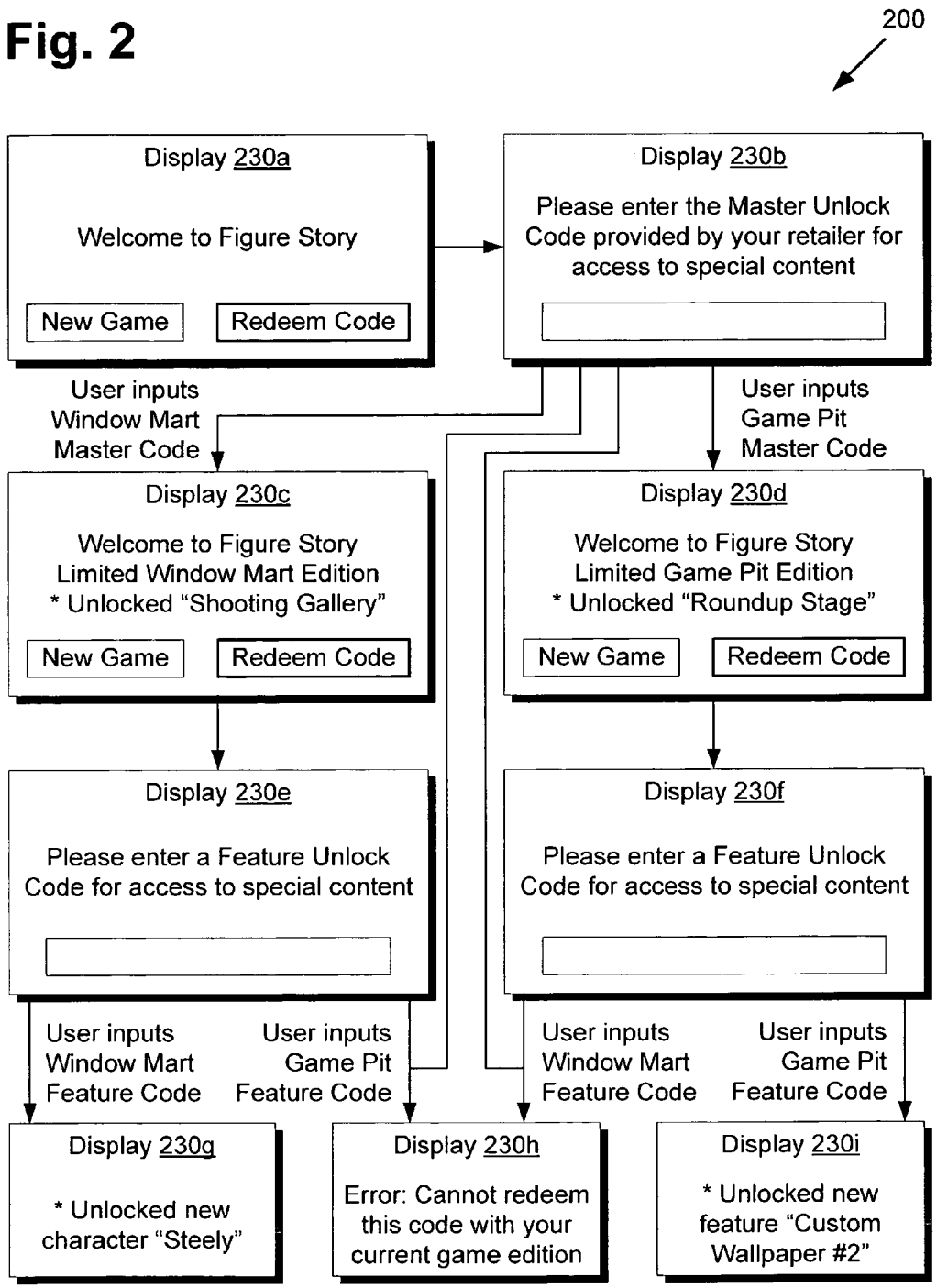

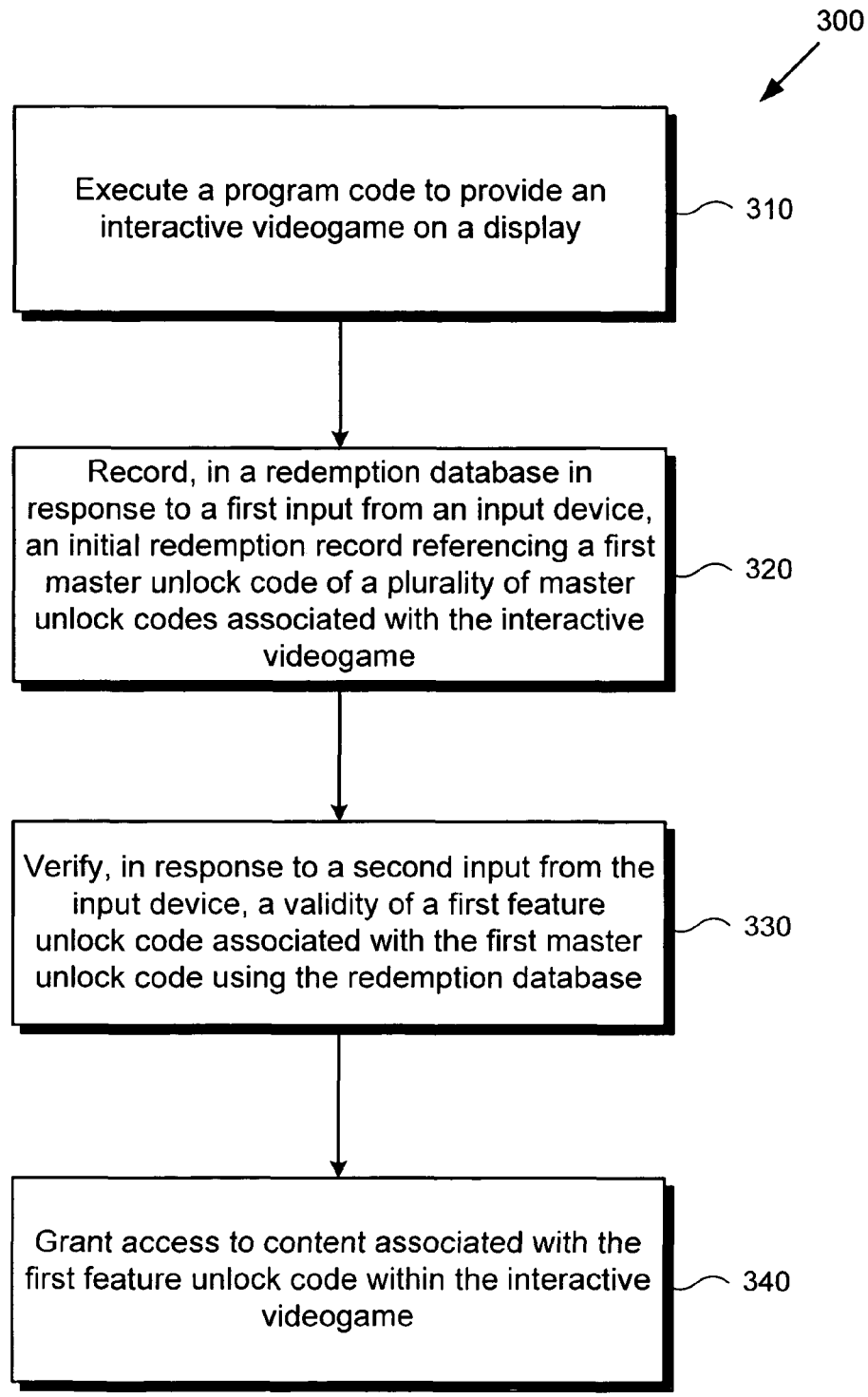

GATED UNLOCK CODES FOR VIDEOGAME FEATURES AND CONTENT

BACKGROUND OF THE INVENTION

1. Field of the Invention

The present invention relates generally to interactive gaming applications. More particularly, the present invention relates to methods for feature unlocking in interactive gaming applications.

2. Background Art

When distributing products such as videogames through retail channels, retailers may often request retailer-specific exclusive content and features to attract consumers. For example, retailers may desire a special customized version, such as a special edition or limited edition package containing exclusive items, characters, downloads, maps, bonus items, or other features specific for the retailer. Retailers can cultivate increased retail store and website traffic by promoting their special or limited edition products through advertising, circular inserts, social networking, and other promotional and marketing channels.

An extension to this approach is for retailers to offer secondary products and services that unlock additional content for the retailer specific videogame product. For example, the purchase of Blu-ray or DVD discs, movie tickets, grocery items, hygiene items, game accessories, premium memberships, or other products and services from the retailer may provide users with ancillary redemption codes for unlocking additional exclusive content. The ancillary redemption codes may comprise, for example, alphanumeric strings to be entered by users or barcodes to be scanned by camera.

Unfortunately, requiring separate packaging and program code for each specific retailer incurs significant additional development effort to implement minor differences between retailer versions. While using a single unified version would avoid this disadvantage, a single unified version would render it difficult to confirm the specific retailer where a consumer may have purchased a game product. As a result, a single unified version would have to accept the redemption codes for all retailers, and consumers could therefore purchase only the secondary products from a particular retailer and redeem the ancillary redemption codes while avoiding the purchase of the primary product, or the videogame, at the same retailer. This is an undesirable situation for retailers seeking to promote and sell both primary and secondary products to consumers.

Accordingly, there is a need to overcome the drawbacks and deficiencies in the art by providing an efficient and cost effective method of providing retailer exclusive features and content while preserving incentives for purchasing both primary and secondary products at a single retailer.

SUMMARY OF THE INVENTION

There are provided systems and methods for gated unlock codes for videogame features and content, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 2 presents a diagram of a user interface for providing gated unlock codes for videogame features and content, according to one embodiment of the present invention; and FIG. 3 shows a flowchart describing the steps, according to one embodiment of the present invention, by which gated unlock codes for videogame features and content may be provided.

DETAILED DESCRIPTION OF THE INVENTION

Figure 1:
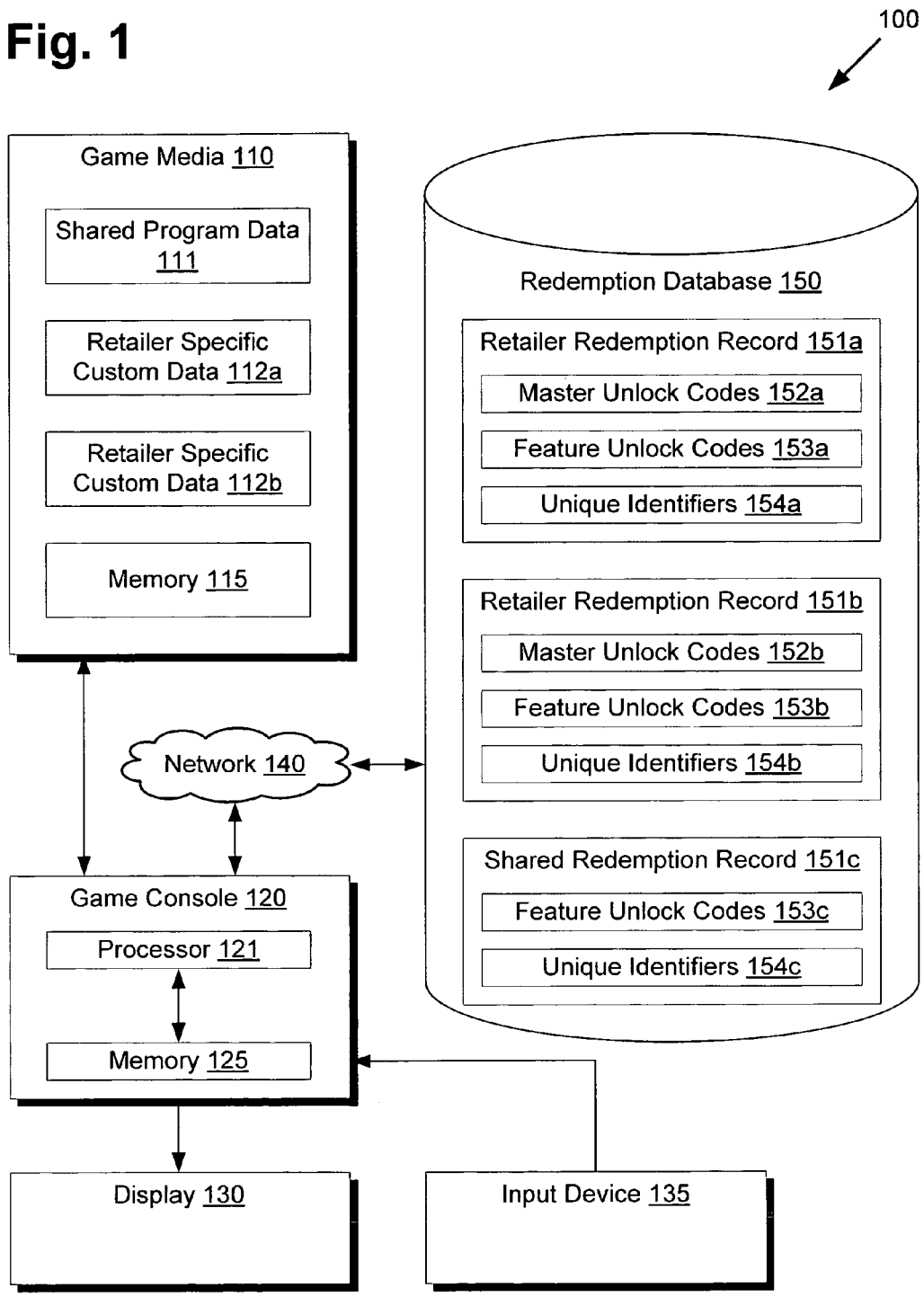
FIG. 1 presents a diagram of a system for providing gated unlock codes for videogame features and content, according to one embodiment of the present invention.

The present application is directed to a system and method for gated unlock codes for videogame features and content. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

FIG. 1 presents a diagram of a system for providing gated unlock codes for videogame features and content, according to one embodiment of the present invention. Diagram 100 of FIG. 1 includes game media 110, game console 120, display 130, input device 135, network 140, and redemption database 150. Game media 110 includes shared program data 111, retailer specific custom data 112a, retailer specific custom data 112b, and memory 115. Game console 120 includes processor 121 and memory 125. Redemption database 150 includes retailer redemption record 151, retailer redemption record 152, and shared redemption record 151c. Retailer redemption record 151a includes master unlock codes 152a, feature unlock codes 153a and unique identifiers 154a. Retailer redemption record 151b includes master unlock codes 152b, feature unlock codes 153b and unique identifiers 154b. Shared redemption record 151c includes feature unlock codes 153c and unique identifiers 154c.

Shared program 111 may comprise game program code and game assets for a video game titled "Figure Story". Retailer specific custom data 112a may contain game assets exclusive to the "Window Mart" retailer, whereas retailer specific custom data 112b may contain game assets exclusive to the "Game Pit" retailer. Memory 115 may comprise flash memory for storing user data, such as save data. In alternative embodiments, game media 110 may comprise read only media, such as an optical disc, in which case memory 115 may be omitted or relocated to game console 120.

Game console 120 may comprise any device capable of functioning as a gaming device, such as a personal computer, a mobile phone, a game console, a portable gaming system, or another device. As shown in diagram 100 of FIG. 1, game media 110 is inserted into game console 120 for reading by processor 121. Additionally, memory 125 may be used to store game data and may include non-volatile portions comprising flash memory or a hard disk drive to store user account data, save data, downloadable content, and other permanent data. Visual data from the videogame may be sent to display 130 for viewing by a user, and the user may use input device 135 to interact with the videogame. Display 130 may comprise, for example an internal LCD display integrated into game console 120 or an external LCD display such as a HDTV or computer monitor, and input device 135 may comprise, for example a touchscreen, a gamepad, a keyboard and mouse, or another input device.

Game console 120 may also connect to network 140, which may comprise a public network such as the Internet, to communicate with redemption database 150. Redemption database 150 may be maintained by the manufacturer of game console 120 or by the creators of game media 110. In the example shown in diagram 100 of FIG. 1, processor 121 may directly query redemption database 150, but in alternative embodiments an intermediary database interface server, not shown in FIG. 1, may be utilized to moderate database query traffic going in and out of redemption database 150.

In some embodiments, game console 120 may lack networking hardware to communicate with network 140, or access to network 140 may be otherwise unavailable. In this case, to interface with redemption database 150, a user may be alternatively instructed by display 130 to perform various manual redemption methods such as accessing a redemption website or calling a telephone redemption system. To embed user or device identifying data, which may correspond to data within unique identifiers 154a through 154c, game console 120 may perform a transform to an entered unlock code to embed identifying data into a special unlock code for use with the manual redemption methods. The user may then be directed to use the special unlock code when accessing the website or telephone system, which in turn may interface with redemption database 150 and return an encoded response code. After the user enters the response code, game console 120 may verify that the alternative redemption was successful and proceed as usual, or may deny access to content if the response code indicates failure. Thus, even if game console 120 cannot directly access network 140, the user may still successfully redeem unlock codes using alternative manual redemption methods.

Redemption database 150 includes several records describing the redemption status of various unlock codes. Retailer redemption record 151a, which may correspond to the "Window Mart" retailer, includes master unlock codes 152a, which may describe all valid and activated master unlock codes referencing the videogame comprising game media 110 for various uniquely identified devices or accounts referenced by unique identifiers 154a. For example, unique identifiers 154a may include an identifier for game console 120, or an identifier for user accounts associated with game console 120. Once a particular device or account redeems a master unlock code by recording an associated redemption record, the device or account may then be considered gated or locked to that master unlock code, or to an associated group or hierarchy of master unlock codes.

For example, if the unique identifier to be used is a unique identifier for game console 120, and the unique identifier is referenced under unique identifiers 154a, then it may be no longer possible to associate game console 120 with another master unlock code, such as master unlock codes 152b corresponding to the "Game Pit" retailer. Thus, the user of game console 120 is now gated or locked into unlocking content reserved for the "Window Mart" retailer only, or feature unlock codes 153a referencing content within retailer specific custom data 112a. Similarly, if unique identifiers 154b includes a unique identifier for game console 120, then game console 120 may be gated or locked into unlocking content reserved for the "Game Pit" retailer only, or feature unlock codes 153b referencing content within retailer specific custom data 112b. However, some content, such as feature unlock codes 153c of shared redemption record 151c, may be accessible globally regardless of master unlock code redemption state.

While the above example assumes a single retailer redemption record for a single retailer, in alternative embodiments some retailers may have multiple associated retailer redemption records, for example to provide seasonal or schedule based promotions, or to provide promotions specific to particular regions or stores. In this case, the retailer redemption records associated with a specific retailer may be grouped together or placed in a hierarchy allowing users to redeem and switch membership between retailer redemption records within the same group or hierarchy. For example, the "Game Pit" retailer may provide master unlock codes for a "Summer" and a "Winter" themed game edition, and the user may be enabled to freely switch membership between the two associated retailer redemption records by re-redeeming the associated master unlock code. Moreover, in some embodiments, the user may be able to concurrently redeem multiple master unlock codes. For example, the "Game Pit" retailer may provide master unlock codes for "Special Content Pack #1", "Special Content Pack #2", and "Special Content Pack #3", which may provide access to different feature unlock codes that can be all unlocked concurrently. Additionally, redeeming a specific set of master unlock codes might provide bonus exclusive feature unlock codes. For example, redeeming all of the "Special Content Pack" codes might provide the user with an exclusive item unlock code.

Thus, by requiring a user to redeem at least one master unlock code prior to redeeming any content or feature unlock codes, users can be gated or locked into redeeming content exclusive to a particular group, such as a specific retailer, as shown in diagram 100 of FIG. 1. Advantageously, since game media 110 may contain the content for all retailers, game media 110 may be produced as a cost effective universal edition for all retailers, avoiding the need for separate versions for each specific retailer.

Additionally, since users may now be gated into specific sets of feature unlock codes, a strong incentive and motivation for purchasing primary and secondary products at a single retailer may be maintained, since users can no longer redeem ancillary or feature unlock codes from any retailer but only from the primary retailer providing the master unlock code. The master unlock code may for example be provided to the user at the point of sale for the primary product or the videogame, for example as a redemption card including an alphanumeric code to be entered by the user using input device 135 or a barcode to be scanned using a camera of game console 120. Although master unlock codes 152a and 152b may each include several unique unlock codes to accommodate multiple purchases, each master unlock code still performs the same function of gating the user to the associated feature unlock codes, and optionally to the associated group or hierarchy of retailer redemption records. The feature unlock codes may be provided to the user in a similar manner as with the master unlock codes, but accompanied with secondary products such as Blu-ray or DVD discs, movie tickets, grocery items, hygiene items, game accessories, premium memberships, or other products and services that may be offered at the retailer.

Moving to FIG. 2, FIG. 2 presents a diagram of a user interface for providing gated unlock codes for videogame features and content, according to one embodiment of the present invention. Diagram 200 of FIG. 2 includes displays 230a through 230i. With regards to FIG. 2, it should be noted that displays 230a through 230i may each correspond to display 130 of FIG. 1.

Display 230a shows a user interface that may be presented to the user after initially executing the videogame software on a gaming device. The user is shown a title screen showing the title of the game, "Figure Story", and is presented with two menu options, "New Game" to start the game, and "Redeem Code" to proceed with code redemption. Assuming the user selects "Redeem Code", the user interface may transition to a state as shown in display 230b.

Display 230b shows a user interface that may be presented to the user after selecting the "Redeem Code" option wherein no previous master code redemptions have been recorded. The user is prompted to enter a Master Unlock Code provided by the retailer where the videogame software was purchased. As previously discussed, the Master Unlock Code may be provided as an alphanumeric code or barcode printed on a redemption card accompanying the sale of the videogame. The user may then enter or scan the code to redeem the Master Unlock Code. The Master Unlock Code may comprise a unique one-time use code that is enabled after the point of sale. Depending on whether the user purchased the videogame from "Window Mart" or from "Game Pit", the user interface may then change to a state shown in display 230c or display 230d, since a different set of Master Unlock Codes are provided at each retailer. If the user attempts to directly enter a Feature Code without redeeming a Master Unlock Code first, then the user may be taken to the screen shown by display 230h, which might further inform the user that a Master Unlock Code must be redeemed first.

Display 230c shows a user interface that may be presented to the user after redeeming a Master Unlock Code associated with the "Window Mart" retailer. As shown in display 230c, the user is returned to the title screen, which now states that it is the "Limited Window Mart Edition". Thus, depending on the particular Master Unlock Code redeemed by the user, the user interface and experience of the videogame may be customized. Furthermore, the redemption of a Master Unlock Code may also include the free redemption of any number of Feature Unlock Codes. As shown in display 230c, the game feature "Shooting Gallery" is automatically unlocked after redeeming the Master Unlock Code.

Similarly, display 230d shows a user interface that may be presented to the user after redeeming a Master Unlock Code associated with the "Game Pit" retailer. As shown in display 230d, the user is returned to the title screen, which now states that it is the "Limited Game Pit Edition". Further, the game feature "Roundup Stage" is automatically unlocked after redeeming the Master Unlock Code.

Displays 230e and 230f show user interfaces that may be presented to the user after selecting the "Redeem Code" option with a Master Unlock Code previously recorded. As shown in displays 230e and 230f, the option to enter a new or changed Master Unlock Code is not provided to the user. Instead, the user is prompted to enter a Feature Unlock Code. If the user enters a Feature Unlock Code associated with a retailer not associated with the Master Unlock Code, then the user interface proceeds to the state shown in display 230h, wherein the redemption is denied and the user is informed that the submitted Feature Unlock Code is not redeemable.

On the other hand, if the user redeems a Feature Unlock Code that is verified to be associated with the previously redeemed Master Unlock Code, then the corresponding game feature or content may be unlocked for the user. Thus, as shown in display 230g, the exclusive content for Window Mart, or the "Steely" character, may be unlocked, whereas in display 230i the exclusive content for Game Pit, or the user interface customization "Custom Wallpaper #2", may be unlocked. Since the Feature Unlock Codes may be provided with the purchase of secondary products at a retailer, the described gated unlock system encourages the purchase of both primary and secondary products at a single retailer as Feature Unlock Codes obtained from the secondary products of other retailers cannot be used.

Moving to FIG. 3, FIG. 3 shows a flowchart describing the steps, according to one embodiment of the present invention, by which gated unlock codes for videogame features and content may be provided. Certain details and features have been left out of flowchart 300 that are apparent to a person of ordinary skill in the art. For example, a step may comprise one or more substeps or may involve specialized equipment or materials, as known in the art. While steps 310 through 340 indicated in flowchart 300 are sufficient to describe one embodiment of the present invention, other embodiments of the invention may utilize steps different from those shown in flowchart 300.

Referring to step 310 of flowchart 300 in FIG. 3 and diagram 100 of FIG. 1, step 310 of flowchart 300 comprises processor 121 of game console 120 executing a program code from shared program data 111 of game media 110 to provide an interactive videogame on display 130. As previously described, shared program data 111 may contain game program code and data assets for a game titled "Figure Story". Processor 121 may accept user input from input device 135 to provide the interactivity for the videogame by updating visuals shown on display 130 accordingly. After step 310, display 130 may appear similar to display 230a in FIG. 2.

Referring to step 320 of flowchart 300 in FIG. 3 and diagram 100 of FIG. 1, step 320 of flowchart 300 comprises processor 121 of game console 120 recording, in redemption database 150 in response to a first input from input device 135, retailer redemption record 151a referencing master unlock codes 152a. Prior to step 320, display 130 may appear similar to display 230b in FIG. 2. As shown in FIG. 1, the plurality of master unlock codes includes master unlock codes 152a and 152b, which are both associated with the interactive videogame provided by shared program data 111. While the plurality of master unlock codes shown in FIG. 1 are each associated with a different retailer, any criteria for categorization may be utilized. Furthermore, while the plurality of master unlock codes may be each associated with mutually exclusive feature unlock codes to reinforce retailer exclusivity, such a condition is not necessarily a requirement. Additionally, as shown by shared redemption record 151c, feature unlock codes 153c may be provided which are redeemable regardless of master unlock code.

Thus, for example, a user may enter or scan a master unlock code within master unlock codes 152a as the first input using input device 135, and game console 120 may then access network 140, for example through mobile broadband or local Wi-Fi, to record retailer redemption record 151 within redemption database 150. As previously described, an intermediary server may also be utilized to moderate communications between game console 120 and redemption database 150, and alternative manual redemption methods may also be supported. Retailer redemption record 151a may optionally include unique identifiers 154a, referencing a unique identifier of gaming device 120 or user accounts associated with gaming device 120.

Furthermore, to prepare for situations when access to redemption database 150 may be unavailable, for example if network 140 is down or no connection is available, retailer redemption record 151a may also be recorded in a non-volatile portion of memory 115 and/or memory 125. In this manner, shared program data 111 can confirm the validity of any prior redemptions even without network access, but any further redemptions of new unlock codes may require reestablishing network connectivity or using a manual redemption method.

After step 320, processor 121 of game console 120 may deny any further attempts to record any further redemption records referencing master unlock codes other than those referenced in master unlock codes 152a. For example, the game program code within shared program data 111 may only allow a single group or hierarchy of master unlock codes to be redeemed, and the record of the initial redemption may be stored in memory 115 or 125. In this manner, the user is forced to choose from exclusive content provided by only one specific group or retailer, thereby enhancing the marketing value and desirability of the exclusive content for each retailer. If the user decides to purchase multiple copies of the videogame at different retailers, then workarounds such as creating multiple user accounts may be supported to provide access to all purchased content.

Furthermore, as shown in display 230c and 230d in diagram 200 of FIG. 2, the recording of the initial redemption record in step 320 may also be utilized to modify and customize the user interface shown to the user. Thus, title graphics and other graphical assets may be changed, sound effects and music may be changed, and other assets may be customized depending on the specific retailer associated with the master unlock code.

Referring to step 330 of flowchart 300 in FIG. 3 and diagram 100 of FIG. 1, step 330 of flowchart 300 comprises processor 121 of game console 120 verifying, in redemption database 150 in response to a second input from input device 135, a validity of a first feature unlock code from feature unlock codes 153a associated with master unlock codes 152a using redemption database 150. Prior to step 330, display 130 may appear similar to display 230e in FIG. 2. The second input may be received from the user in a similar manner to the first input from step 320. Processor 121 may then query redemption database 150 for the existence of retailer redemption record 151a, wherein the requested first feature unlock code is confirmed to exist within feature unlock codes 153a. Furthermore, the query may confirm that unique identifiers 154a includes an identifier for game console 120 or a user account on game console 120, and that a prior redemption using a master unlock code from master unlock codes 152a has previously occurred.

Referring to step 340 of flowchart 300 in FIG. 3 and diagram 100 of FIG. 1, step 340 of flowchart 300 comprises processor 121 of game console 120 granting access to retailer specific custom data 112a. After step 340, display 130 may appear similar to display 230g of FIG. 2, informing the user that a specific feature is now unlocked. Thus, the program code within shared program data 111 may begin using the assets and features referenced in retailer specific custom data 112a by the first feature unlock code submitted in step 330. For example, character models, voices, and other data relating to the "Steely" character may be made accessible. In this manner, the user is enabled to redeem feature unlock codes associated with a specific retailer or another grouping criteria, providing value added contents for users while maintaining user incentives to shop for primary items, or videogame software, and secondary items such as accessories at a single specific retailer offering desirable exclusive content.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A gaming device providing gated unlock codes for videogame features and content, the gaming device comprising:
   a processor configured to:
      execute a program code to provide an interactive videogame on a display;
      record, in a redemption database in response to a first input from an input device, an initial redemption record referencing a first master unlock code of a plurality of master unlock codes associated with the interactive videogame;
      verify, in response to a second input from the input device, a validity of a first feature unlock code associated with the first master unlock code using the redemption database; and
      grant access to retailer specific content associated with the first feature unlock code within the interactive videogame;
   wherein after the recording the processor is further configured to prevent a recording of further redemption records referencing a master unlock code different than the first master unlock code.

2. The gaming device of claim 1, wherein each of the plurality of master unlock codes is associated with a retailer.

3. The gaming device of claim 1, wherein the initial redemption record further includes a unique identifier of the gaming device.

4. The gaming device of claim 1, wherein the initial redemption record further includes a unique identifier of a user account associated with the gaming device.

5. The gaming device of claim 1, wherein the processor is further configured to record the initial redemption record in a memory of the gaming device.

6. The gaming device of claim 1, wherein the processor is further configured to record the initial redemption record in a memory of a media storing the program code.

7. The gaming device of claim 1, wherein the program code uses the initial redemption record to modify a user interface of the interactive videogame shown on the display.

8. The gaming device of claim 1, wherein the first master unlock code is provided with a purchase from a first retailer of a game media containing the program code, and wherein the first feature unlock code is provided with a purchase from the first retailer of a secondary item.

9. The gaming device of claim 1, wherein the plurality of master unlock codes are each associated with mutually exclusive feature unlock codes.

10. A method for providing gated unlock codes for videogame features and content using a gaming device having a memory and a processor, the method comprising:
   executing, using the processor, a program code stored in the memory to provide an interactive videogame on a display;
   recording, in a redemption database in response to a first input from an input device, an initial redemption record referencing a first master unlock code of a plurality of master unlock codes associated with the interactive videogame;

preventing a recording of further redemption records referencing a master unlock code different than the first master unlock code;

verifying, in response to a second input from the input device, a validity of a first feature unlock code associated with the first master unlock code using the redemption database; and granting access to retailer specific content associated with the first feature unlock code within the interactive videogame.

11. The method of claim 10, wherein each of the plurality of master unlock codes is associated with a retailer.

12. The method of claim 10, wherein the initial redemption record further includes a unique identifier of the gaming device.

13. The method of claim 10, wherein the initial redemption record further includes a unique identifier of a user account associated with the gaming device.

14. The method of claim 10, wherein the recording further stores the initial redemption record in a memory of the gaming device.

15. The method of claim 10, wherein the recording further stores the initial redemption record in a memory of a media storing the program code.

16. The method of claim 10, wherein the first master unlock code is provided with a purchase from a first retailer of a game media containing the program code, and wherein the first feature unlock code is provided with a purchase from the first retailer of a secondary item.

17. The method of claim 10, wherein the plurality of master unlock codes are each associated with mutually exclusive feature unlock codes.

18. The method of claim 10, wherein the program code uses the initial redemption record to modify a user interface of the interactive videogame shown on the display.

* * * * *